March 10, 1942.  A. E. F. BILLSTEIN  2,276,011
MEANS FOR LOCATING DEFECTS IN METAL ARTICLES
Filed Nov. 9, 1940  2 Sheets-Sheet 2
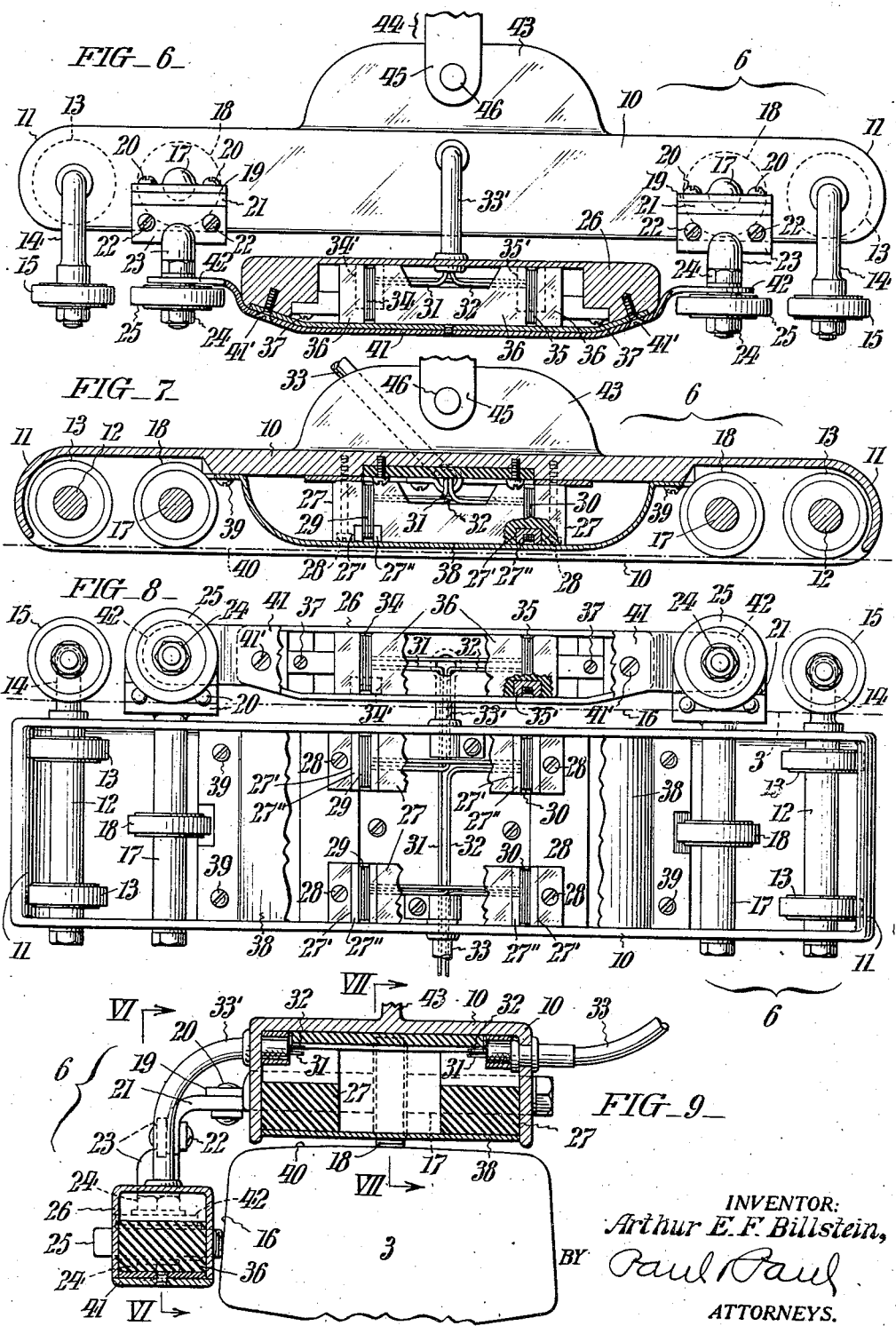
INVENTOR:
Arthur E. F. Billstein,
BY Paul & Paul
ATTORNEYS.

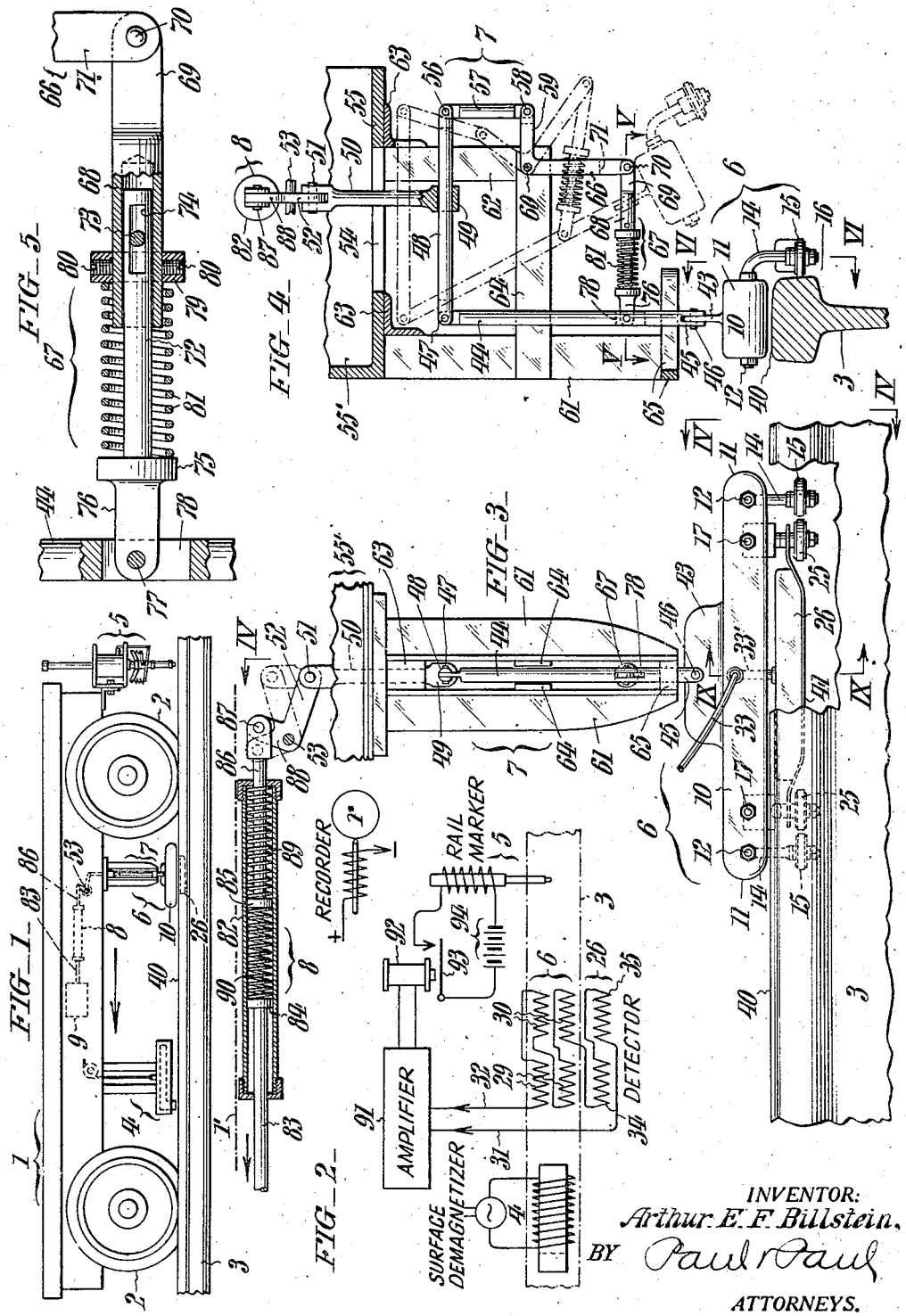

Patented Mar. 10, 1942

2,276,011

UNITED STATES PATENT OFFICE 2,276,011

MEANS FOR LOCATING DEFECTS IN METAL ARTICLES

Arthur E. F. Billstein, Altoona, Pa., assignor to The Pennsylvania Railroad Company, Philadelphia, Pa., a corporation of Pennsylvania Application November 9, 1940, Serial No. 364,955

15 Claims. (Cl. 175—183)

This invention in its broader aspects relates to means for locating imperfections and other defects in metallic bars, shapes, pipes and analogous articles, incidental to production of a magnetic flux locally thereabout and by aid of means responsive to variations in such flux.

Devices of the species referred to generally include brushes or the like for supplying electric current to the article, at spaced points, to produce a magnetic field around said article, flaws and other imperfections being located by a detector unit over-traveling the article within said magnetic field; as well as utilizing sets of detector coils in conjunction with a conductor energized with current to establish an electromagnetic field. It has also been proposed to determine the presence of imperfections and so forth by measuring the current flow or voltage drop between the spaced points in the rail, while other means have been suggested for setting up a magnetic field in the article by electromagnetic induction.

The fundamental objective of this invention is a novel means whereby flaws, fissures and other imperfections within metal rails, bars, shapes and pipes are located by reliance on the earth's magnetic field and the inherent inductive properties of such rails, etc., and measuring the leakage flux at flaws and other imperfections. In other words, by this invention provision is made whereby track rails, bars, etc., can be tested, for internal and external defects, from end to end without cutting out or decreasing the testing efficiency approximately one foot beyond each end of the joint-bar as is necessary with previous methods.

Another object of this invention is the provision of a novel detector device of the indicated species, including oppositely-wound pairs of coils operative above and along one side of the rail head.

A further object is the provision of a rail flaw detector mechanism including novel means whereby the detector is flexibly supported from a test car, or trailer truck, said means being operative to move the detector into and out of coactive relation with respect to the head of the rail as required or expedient.

Other objects with ancillary advantages of this invention will become apparent from the following detailed explanation of the preferred embodiment thereof shown by the accompanying two sheets of illustrative drawings, wherein like reference characters designate corresponding parts in all the views; while the concluding claims more particularly define the features of novelty over prior art.

In the drawings:

Fig. 1 is a somewhat diagrammatic side elevation of a railroad track testing or inspection car having the flaw detector mechanism of this invention included therein, and with associated demagnetizing and marking devices.

Fig. 2 is a circuit diagram of what may be termed a "natural magnetic" means for detecting transverse imperfections in rail in accordance with this invention.

Fig. 3 is a longitudinal side elevation of the detector mechanism and connected means for the resilient support thereof from a track inspection car, certain parts being broken out and others in section for clearer illustration of details.

Fig. 4 is a staggered end elevation of the preceding figure, or as viewed in the direction of the arrows IV—IV thereon, said figure also having parts in section for the better disclosure of otherwise obscured structure.

Fig. 5 is a larger scale detail section, taken approximately on the plane V—V of Fig. 4.

Fig. 6 is a part side and part vertical section of the detector mechanism, drawn to a further enlarged scale, and as viewed substantially within the confines of the plane indicating arrows VI—VI of Figs. 4 and 9.

Fig. 7 is a vertical longitudinal section on the plane VII—VII in Fig. 9.

Fig. 8 is an underside plan view of the detector mechanism drawn to the same scale as the two preceding figures; and, Fig. 9 is a transverse section on the plane IX—IX of Fig. 3.

In describing the embodiment of this invention exemplified in the accompanying two sheets of drawings herewith, specific terms will be employed for the sake of clarity, but it is to be understood the scope of said invention is not thereby limited; each such term being intended to embrace all equivalents which perform the same function for an analogous purpose.

Referring more in detail to the drawings, Fig. 1 shows a typical adaptation of this invention to a railroad track testing or inspection car 1, having wheels 2 for traversing the rail 3; said car carrying a surface demagnetizer 4 preferably of the type forming the subject matter of my prior U. S. Patent No. 2,218,784, dated October 22, 1940; a marking device 5 preferably of the type disclosed in a companion application for patent filed herewith under Serial Number 364,956; and the novel detector mechanism now to be fully disclosed. This detector mechanism includes the detector comprehensively designated 6 and the supporting means 7 therefor, said means being coupled to an appropriate actuator 8 conveniently under operative control of an air valve 9.

The detector 6, as shown to best advantage in Figs. 6–9, inclusive, comprises an inverted hollow-casing or shoe 10, preferably of rectangular contour and appropriate non-magnetic metal, with the major dimension lengthwise of the rail 3, while the ends 11 of said holder 10 are downwardly curved to define arcual shields. In proximate relation to the shoe ends 11 and preferably coaxial with the curvature thereof are stationary shafts 12 with shoe supporting or rail running surface rollers 13, while said shafts are extended and downwardly angled at 14, inwards with respect to the rail 3, for horizontal rotary support of auxiliary rollers 15 coactive with the gage side face 16 of said rail, and serving to maintain the shoe 10 substantially centralized lengthwise of the rail running surface or head. In addition, as well as inwardly spaced with respect to the shafts 12, the shoe 10 is provided with planarly parallel shafts 17, each of which affords rotative bearing for a rail running-surface roller 18, preferably located in the longitudinal median of the shoe 10; while the inner ends of the shafts 17 are appropriately shaped to define projecting tabs 19 for attachment, by suitable means 20, of flexible connectors 21, the purpose whereof is later on set forth. These flexible connectors 21, in turn, afford attachment, as by screws 22, for hanger members 23, fitted with suitable supporting means 24 for horizontally rotative gage line rollers 25, as well as an auxiliary or detector housing 26, preferably of aluminum or similar metal, for progression along the inner side face 16 of the rail 3, and the purpose whereof will be hereinafter fully explained.

Mounted within the hollow shoe 10 between conventional insulate material spacer blocks 27, held in place by securing means 28, are axially aligned and laterally spaced pairs of oppositely wound coils 29, 30 in conductive communication by leads 31, 32, of a common cable 33, with an amplifier 91, Fig. 2, and later on again referred to. Also in circuit with the coils 29, 30 in the housing 26 are an aligned pair of similarly wound coils 34, 35 with associated spacer blocks 36 and securing means 37. The coil hook-up just described, as within the shoe 10, is closed-in preferably by a comparatively thin dished non-magnetic shield 38 held in place by screws 39, in an obvious manner. This non-magnetic shield 38 is shaped and proportioned to closely approach but never contact the running surface 40 of the rail 3. The hook-up in the auxiliary detector housing 26 is closed-in preferably by a thin multi-ply magnetic shield 41, conveniently held in place by screws 41', one of said plies having apertured end extensions 42 for eye-connection to the hanger members 23, by the supporting means 24, in a manner closely obvious from Figs. 6 and 8 more particularly; while the extension of the service cable 33 between the shoe 10 and auxiliary detector 26 is designated 33' in said figures, as well as in Fig. 9, for better identification.

Referring again to the several coils 29, 30, it is to be particularly noted that the respectively associated spacer blocks are suitably recessed at 27' for reception of magnetic material channel-section inserts 27'', the web portions whereof are over-wound by said coils, whereas the flange portions project into contact with the inner face of the shield 38, as clearly understandable from Figs. 7 and 8. Similarly the coils 34, 35 in the auxiliary detector housing 26 are provided with corresponding magnetic inserts 34', 35', with the flange edges directed laterally towards the gage side face 16, of the rail 3, said inserts also preferably not extending downwards into abutment with the multi-ply shield 41, as shown by the dotted outline thereof in Fig. 6.

In order to flexibly support the detector means 10 and 26 as a unit from the car 1, the former is provided with a centrally located flange or web 43 projecting upwardly from the top of the shoe 10 and lengthwise thereof. Reference will now be had to Figs. 3 and 4 more particularly, and from said figures it will be seen that the suspension means is of somewhat pantographic character, that is to say it comprises a member 44 having the lower slotted end 45 pivoted at 46 to the center part of the shoe web 43. The upper end of this member 44 has fulcrumed thereto at 47 a horizontal member 48, in turn supported in the eye-end 49 of a second suspension member 50, having pivotal connection at 51 to the free end of the longer arm 52 of a bell-crank, fulcrumed at 53 to a stationary part or fixed component of the superstructure of the car 1, while a slot 54 is provided in the horizontal part 55 of a bracket 55', for free passage of said suspension member 50. Pivoted at 56 to the outer end of the horizontal member 48 is a link 57, normally in parallel with respect to both suspension members 44, 50, and having the lower end coupled at 58 to the shorter arm 59 of a preferably right-angle lever, fulcrumed at the angular part to a stationary pivot 60 conveniently supported across the outer lower diagonal spaced corners of a framework of rigidly connected vertical and horizontal angle sections 61, 62 and 63, respectively, with the latter sections 63 securely attached to the underside of the bracket part 55 aforesaid. The vertical angle sections 61, 62 are braced and maintained in permanent parallelism by straps 64, while the outer and longer pair 61 of said sections have firmly mounted therebetween at the lower end, a horizontally disposed U-shaped guide member 65. The normally vertical and longer arm 66 of the right-angle lever fulcrumed to the pivot 60 is flexibly coordinated with the suspension member 44 by a coupling device generally designated 67 in Figs. 3–5. This coupling device 67, as best shown in Fig. 5, comprises a tubular member 68 having one end closed-in and provided with a diametric extension 69 connected by a pin 70 in the slotted end 71, Fig. 4, of the angle-lever arm 66. Slidable within the tubular member 68 is a plunger 72, said plunger being restrained against rotary movement by a diametric pin 73 across said member engaging through a longitudinal slot 74, in the inner part of the plunger 72. The slot 74 also limits telescopic movement of the plunger 72 relative to the tubular member 68, while said plunger is furnished with a head 75 and diametric apertured extension 76, coupled by a pin 77 in a longitudinal slot 78 through the suspension member 44. Intermediate the plunger head 75 and an adjustable collar 79, held firmly in place by set-screws 80 to the tubular member 68, is a coil spring 81 in compression; and it is to be noted that the parts just described are initially set by the screws 80 so that when the rollers 15, 25 approximately contact the gage region of the rail 3, the suspension member 44, angle-lever arm 66 and link 57 are substantially vertical, whereas the member 48, angle-lever arm 59 and flexible coupling 67 are all similarly horizontal. Thus it will be readily apparent that, incidental to the pivotal connection, at 49, between the member 48 and suspension 50, as well as by the use of the flexible connectors 21, positive provision is made for free movement of the supporting means 7 to accommodate lateral shifting of the detector shoe 10 and auxiliary detector 26 relative to the rail 3 in rounding curves, swaying of car, and so forth, or straining of the suspension 50; while the rollers 25 under the influence of the spring 81 will always be maintained in contact with the gage face 16 of the rail 3 when the detector 6 is in the active position.

Referring now to the actuator 8 whereby the supporting means 7 is moved from the active to inactive position, or as indicated by the full and dot-and-dash lines, respectively, in Fig. 4, use is made of a suitable cylinder 82, appropriately supported below the floor 1' (Fig. 2) of the car 1, in communication with a source of power—not shown—such as pressure air under control of the valve 9, said valve being operatively coordinated by a rod 83 to a piston 84 in one part of the cylinder 82. Operative in the other portion of the cylinder 82 is a second piston 85, the rod 86 whereof is coupled at 87 to the shorter arm 88 of the bell crank coordinated with the suspension member 50. The piston 85 is inwardly influenced by a spring 89 of determined strength for flexible support of the means 7 and detectors 10, 26, in the full-line position of Fig. 4, in opposition to the reactive influence of a second spring 90 intermediate the pistons 84, 85. Now it will be readily understood, by those conversant with the art, that when the piston rod 83 is pressure influenced in the direction of the arrow in Fig. 3, the springs 89, 90 will jointly function to move the piston 85 in the same direction, whereby the bell crank 52, 88 will be rocked counter-clockwise on the stationary fulcrum 53 and, though the suspension members 44, 50, move the supporting means 7, with the sustained detectors 10 and 26 from the full-line position to the dot-and-dash one in Fig. 4; whereas, when such pressure is released a reverse action takes place under the cushioning influence of the springs 89, 90 and buffer spring 81.

Having described the structural aspects of the means for locating defects in metal articles in accordance with this invention, and by joint reference to the diagram of Fig. 2, it is to be noted that in practice the surface demagnetizer 4 and recorder r are preferably and individually in independent circuits for A. C. electrical energy—not shown—on the inspection car 1. On the other hand, the detectors 6 and 26 are in a hook-up including the amplifier 91, a relay 92, switch 93 and battery 94 controlling operation of the marking device 5. Now, as is well known, each length of rail 3, incidental to the heavy pounding of rolling stock passing thereover and the earth's magnetic field, becomes magnetized from end to end with natural flux which remains constant when said rail is sound or devoid of faults and flaws. On the other hand, wherever a fissure or other flaw occurs in the head of the rail 3, or faults are exterior thereof, the natural magnetic field will be cut or interrupted and varied, such variations being picked-up by the respective inserts 27", and 34', 35' of the reversely wound coils 29, 30 of the detector 6 and the similarly wound coils 35, 36 of the auxiliary detector 26, and thence transmitted to the amplifier 91 and relay 92, with resultant excitation of said relay to close the switch 93 and operate the marking device 5 by current from the battery 94.

Particular attention is directed to the fact that the shield plate 41 of the auxiliary housing 26 prevents flux coming out from the top of the rail joint bar, lapping the adjoining ends of aligned rails, resulting in an indication while testing said joint bar area. However, leakage flux at a defect which issues from the side of the rail head is not prevented from passing through the aluminum of the auxiliary detector housing 26 to be "cut" by the coils 34, 35, and thereby permitting, or positively providing for, examination of the entire length of the rail 3, while not being influenced by flux from the joint bar.

From the foregoing the merits and advantages of this invention will be fully comprehended and, while one practical embodiment thereof has been explained in detail in connection with the accompanying drawings, it is to be understood that said invention is not limited thereby but is capable of a variety of other expressions, and that changes may be made in the form, construction and arrangement of parts, without departing from the spirit of said invention. Reference is, accordingly, to be had to the following claims for a definition of the limits and scope of this invention.

Having thus described my invention, I claim:

1. Defect locating means for testing rail subject to a natural magnetic field comprising, a main detector including spaced sets of oppositely wound aligned coils for coaction with the rail head top surface, an auxiliary detector with corresponding coils coactive with the side face of said head and in series with the first mentioned coils, and means flexibly supporting the auxiliary detector in spaced relation to the main detector.

2. Defect locating means for testing rail subject to a natural magnetic field comprising, a main detector with spaced sets of oppositely wound aligned coils, each said coil including a magnetic insert confronting the railhead; an auxiliary detector with a pair of corresponding coils having similar inserts for coaction with the gage side of the head of the rail; all of said coils being in series; and means flexibly supporting the auxiliary detector in spaced relation to the main detector.

3. Defect locating means for testing rail subject to a constant natural magnetic field comprising, a main detector with spaced sets of oppositely wound aligned coils, each said coil including a magnetic metal insert partially confronting the rail head; an auxiliary detector with a pair of corresponding coils having similar inserts, for coaction in part with the gage side of the rail head, in series with the first mentioned coils; means flexibly supporting the auxiliary detector in flanking parallelism from the main detector, and mechanism for moving the defect locating means into and away from conductive influence from the rail magnetic field.

4. Defect locating means for testing rail subject to a natural mangetic field comprising, a main detector including spaced sets of oppositely wound aligned coils, an auxiliary detector with a pair of corresponding coils in series with the first mentioned coils, flexible members supporting the auxiliary detector in flanking parallelism below the main detector, and a pantographic system of pivotal members operative to jointly lower and raise the main and auxiliary detectors into and away from inductive influence by the rail magnetic field.

5. Defect locating means for testing rail subject to a natural magnetic field comprising, a main detector with paralleling sets of oppositely wound aligned coils and associated spacers, each said coil having a lapping magnetic metal insert confronting the rail running surface; an auxiliary detector with a pair of corresponding coils having similar magnetic inserts for coaction with the gage side face of the rail head, in series with the first mentioned coils; flexible members supporting the auxiliary detector in flanking parallelism below the main detector, and a pantographic system of pivotal members operative to jointly lower and raise the main and auxiliary detectors into and away from inductive influence by the rail magnetic field.

6. The combination of claim 5, wherein each coil magnetic-metal inserts is in the form of a channel section straddling the coil, and the flange portions of said section face outwards.

7. The combination of claim 5, wherein the coil magnetic-metal inserts of the main detector extend horizontally across said detector, and the corresponding coil inserts of the auxiliary detector are vertically limited to the gage line region of the rail head.

8. The combination of claim 5, wherein the pantographic system of pivotal members includes an angle lever, and an operatively coordinated flexible coupling effects inward and outward angular movement to the detectors during the lowering and raising thereof respectively.

9. The combination of claim 5, further characterized by a power operative actuator for raising the defect locating means to the inactive position, and cushion means serves to lower and maintain said defect locating means in active location with respect to the rail.

10. The combination of claim 5, wherein the main detector consists of an inverted elongated hollow shoe housing transverse freely rotative rollers for coaction with the rail running surface, axially-aligned laterally-spaced pairs of oppositely wound coils with lapping magnetic metal inserts fitting recesses in the associated spacer blocks in said shoe, a pair of oppositely wound similar coils in the auxiliary detector housing, and all of said coils are serially wound.

11. The combination of claim 5, wherein the main detector includes freely rotative transverse rollers for progressive coaction with the rail running surface, and the auxiliary detector has similar rollers disposed for approximate coaction with the gage line of the rail whereby said detectors partially surround the rail head.

12. The combination of claim 5, wherein the main detector shoe sets of aligned coils and associated spacers are enclosed by a dished non-magnetic shield.

13. The combination of claim 5, wherein the auxiliary detector coil housing is closed in by a magnetic shield, and means for attaching said shield to the coil housing and to the flexible supporting members.

14. The combination of claim 5, wherein the auxiliary detector coil housing is closed in by a multi-ply magnetic shield, the outer of said plies having eyed extensions for attachment to the flexible supporting members, and means for securing said plies together and to the coil housing.

15. The combination of claim 5, wherein the main and auxiliary detectors are made of aluminum, the rail head confronting surface of the main detector includes a non-magnetic shield portion, and a magnetic shield is included in the auxiliary detector.

ARTHUR E. F. BILLSTEIN.